United States Patent [19]

Sundermann et al.

[11] 4,094,852
[45] June 13, 1978

[54] PROCESS FOR THE PRODUCTION OF POLYTRIAZINES IN THE PRESENCE OF HIGH-BOILING ESTERS

[75] Inventors: Rudolf Sundermann, New Martinsville, W. Va.; Günther Rottloff, Cologne, Germany; Ernst Grigat, Odenthal-Gloebusch, Germany; Rolf Putter, Dusseldorf, Germany

[73] Assignee: Bayer Aktiengesellschaft, Germany

[21] Appl. No.: 707,546

[22] Filed: Jul. 22, 1976

[30] Foreign Application Priority Data

Jul. 24, 1975 Germany ............................. 2533124

[51] Int. Cl.$^2$ .............................................. C08G 73/06
[52] U.S. Cl. ......................... 260/37 N; 252/188.3 R; 260/47 R; 260/47 CZ; 260/47 CP; 260/49; 260/61
[58] Field of Search ........... 260/47 R, 47 CZ, 47 CP, 260/49, 61, 37 N; 252/188.3 R

[56] References Cited

U.S. PATENT DOCUMENTS

| | | |
|---|---|---|
| 3,502,617 | 3/1970 | Schminke et al. ...................... 260/47 |
| 3,694,410 | 9/1972 | Orhmke .............................. 260/47 R |
| 3,738,962 | 6/1973 | Loudas et al. ....................... 260/47 R |
| 3,960,783 | 1/1976 | Seltzer et al. ......................... 260/2 R |

*Primary Examiner*—Lester L. Lee
*Attorney, Agent, or Firm*—Connolly and Hutz

[57] ABSTRACT

A polytrimerizable mixture of
 30 to 99.9% by weight of at least one aromatic, polyfunctional cyanic acid ester or a prepolymer thereof, and
 0.1 to 70% by weight of at least one high-boiling ester with a boiling point above 250° C at 760 Torr, said mixture results in polytriazines having a significant improvement in elasticity, flexibility and resistance to hydrolysis.

7 Claims, No Drawings

PROCESS FOR THE PRODUCTION OF POLYTRIAZINES IN THE PRESENCE OF HIGH-BOILING ESTERS

This invention relates to a process for the production of polytriazines by the polytrimerisation of aromatic cyanic acid esters in the presence of high-boiling esters. The polytriazines obtained in accordance with the invention are unaffected by moisture, they are elastic and, in some cases, non-inflammable, depending on the quantity in which the high-boiling ester is added.

It is known from German Patent Specification No. 1,190,184 that high molecular weight polytriazines can be obtained by polymerising difunctional or polyfunctional aromatic cyanic acid esters at elevated temperature, optionally in the presence of polymerisation promoters. The polymers are characterised for example by their remarkable stability at elevated temperatures and they are duroplastic in character after tempering for a sufficiently long period. The resistance of the polytriazines to acids and various solvents may also be emphasised. It was not possible to detect any changes in test specimens that had been stored for three months in benzene, dimethyl formamide, super petrol, concentrated acetic acid, trichloroacetic acid, chromic acid, aqueous formaldehyde solution, fuel oil, saturated sodium phosphate solution and concentrated hydrogen peroxide (cf. Kunststoffe 58, number 19, pages 827 to 832 (1968)).

In addition, it was found by V.V. Korchak et al (cf. Vysokomolekulyarnye soedineniya 1974, number 1, pages 15 to 21) that the thermal and thermo-oxidative destruction of polytriazines based on aromatic cyanic acid esters is greatly influenced by moisture.

Finally, it is known from German Patent Specification No. 1,720,740 that polyfunctional aromatic cyanic acid esters can be combined with powder-form and/or fibrous fillers or reinforcing materials and subjected either to a preliminary or subsequent heat treatment at about 50 to 150° C, the resulting moulding composition moulded and hardened at temperatures in the range from about 150° to 250° C. In many cases the resulting mouldings also show inadequate thermal stability after storage in a moist, tropical atmosphere.

An object of the present invention is to improve the polytriazines in regard to their resistance to moisture. Another object of the invention is to improve the elasticity and non-inflammability of the polytriazines.

According to the invention, these objects are achieved by carrying out the polytrimerisation of the aromatic cyanic acid esters in the presence of high-boiling esters.

Accordingly, the present invention relates to a process for the production of elastic, non-inflammable polytriazines unaffected by moisture by polytrimerising aromatic cyanic acid esters, wherein polymerisation is carried out in the presence of high-boiling esters.

The aromatic cyanic acid esters correspond to the general formula $$A(OCN)_n \quad (I)$$

in which A represents an aromatic radical or an aromatic radical interrupted by one or more bridge members, and $n$ is a numer from 2 to 5.

The aromatic cyanic acid esters of formula (I) used in accordance with the invention are known compounds, for example from U.K. Patent Specification No. 1,007,790 and may be produced by the process described in that Patent Specification.

1 to 1.1 mole of cyanogen halide and 1 mole of a base or mixture of bases may be used per phenolic hydroxyl group. The reaction temperatures are in the range from $-40°$ C to $+65°$ C. Suitable bases are inorganic bases, such as sodium hydroxide, potassium hydroxide, soda, potash, calcium hydroxide, or tertiary amines such as trimethylamine or triethylamine, whilst suitable solvents or suspending agents include water, alcohols, ketones, hydrocarbons, chlorinated hydrocarbons or mixtures thereof.

The aromatic cyanic acid esters preferably correspond to the general formula (II)

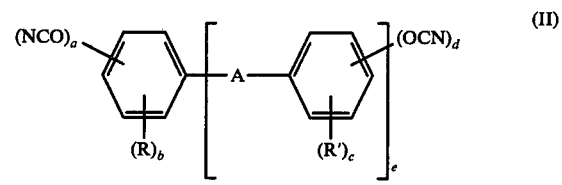

in which

R represents hydrogen, halogen (fluorine, chlorine, bromine iodine), linear or branched chain $C_1$- to $C_9$-alkyl or phenyl, several radicals R not having to be the same, or two adjacent groups represented by R on the same nucleus together may form a carbocyclic 5-membered or 6-membered ring or together with a hetero atom (O, S, N) may form a 5-membered or 6-membered heterocyclic ring, alkoxy radicals with 1 to 4 carbon atoms, alkoxy carbonyl radicals with 1 to 4 carbon atoms in the alkyl group;

R' has the same meaning as R or represents the group

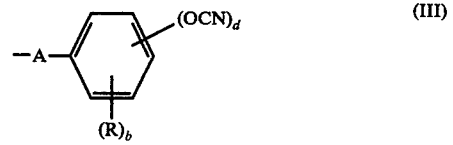

A is a direct bond; an alkylene group with 1 to 9 carbon atoms optionally substituted by $C_1$ to $C_4$-alkyl or phenyl; a cycloaliphatic or aromatic 5-membered or 6-membered ring optionally interrupted by oxygen; oxygen; the sulphonyl group ($-SO_2-$); the carbonyl dioxy group

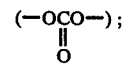

the carbonyl group;

$a$ is a number from 0 to 5 where $e = 1$, and a number from 2 to 5 where $e = 0$;
$b = 5 - a$ where $e = 1$, and $6 - (a + d)$ where $e = 0$;
$c = 5 - d$;
$d$ = a number from 0 to 5;
$e = 0, 1, 2$ or $3$;
with the proviso that the sum of $a + d$ is always a number from 2 to 5.

More especially, the symbols in formula (II) have the following meaning:

R represents hydrogen, fluorine, chlorine, or bromine, $C_1$-$C_4$-alkyl, methoxy, ethoxy, methoxycarbonyl, ethoxycarbonyl, butoxy carbonyl;

A represents a direct bond, oxygen, the sulphenyl group, the carbonyl group, the carbonyl dioxy group, the methylene, ethylene, the 2,2-propylene group

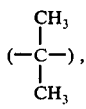

the cyclohexylene radical a = the number 1 where e = 1, and the number 2, where e = 0;
b = the number 1 or 2, more especially the number 1;
c = the number 1 or 2, more especially the number 1;
d = the number 0 or 1, and
e = the number 0 or 1, with the proviso that $a + d = 2$.

The following are mentioned as examples of compounds corresponding to formula (I):

1,3-and 1,4-dicyanatobenzene, 2-tert.-butyl-1,4-dicyanatobenzene, 2,4-dimethyl-1,3-dicyanatobenzene, 2,5-di-tert.buytl-1,4-dicyanatobenzene, tetramethyl-1,4-dicyanatobenzene, 2,4,6-trimethyl-1,3-dicyanatobenzene, 4-chloro-1,3-dicyanatobenzene, 1,3-, 1,4-, 1,5-, 1,6-, 1,7-, 1,8-, 2,6-, 2,7-, dicyanatonaphthalene, 1,3,5-tricyanatobenzene; 4,4'dicyanatodiphenyl, 2,2'-dicyanatodiphenyl, 3,3', 5,5'-tetramethyl-4,4'-dicyanatodiphenyl, 3,3', 5,5'-tetrachloro-4,4'-dicyanatodiphenyl, 3,3', 5,5'-tetrachloro-2,2'-dicyanatodiphenyl, 2,2',6,6'-tetrachloro-4,4'-dicyanatodiphenyl, 4,4'-bis-[(3-cyanato)-phenoxy]-diphenyl, 4,4'-bis-[(4-cyanato)-phenoxy]-diphenyl; 2,2'-dicyanato-1,1'-bi-naphthyl; 4,4'-dicyanatodiphenyl ether, 3,3', 5,5'-tetramethyl-4,4'-dicyanatodiphenyl ether, 3,3',5,5'-tetrachloro-4,4'-dicyanatodiphenyl ether, 4,4'-bis-[p-cyanatophenoxy]-diphenyl ether, 4,4'-bis-[p-cyanatophenylisopropyl]di-phenyl ether, 4,4'-bis-[p-cyanatophenoxy]-benzene, 4,4'-bis-[m-cyanato-phenoxy]-diphenyl ether, 4,4'-bis-[4-(4-cyanatophenoxy)-phenylsulphone]-diphenyl ether; 4,4'-dicyanatodiphenylsulphone, 3,3',5,5'-tetramethyl-4,4'-dicyanatodiphenylsulphone, 3,3',5,5'-tetrachloro-4,4'-dicyanatodiphenylsulphone, 4,4'-bis-[p-cyanato-phenylisopropyl]-diphenylsulphone, 4,4'-bis-[(4-cyanato)-phenoxy]-diphenylsulphone, 4,4'-bis-[(3-cyanato)-phenoxy]-diphenylsulphone, 4,4'-bis[4-(4-cyanatophenylisopropyl)-phenoxy]-diphenylsulphone, 4,4'-bis-[4-cyanatophenylsulphone)-phenoxy]-diphenylsulphone, 4,4'-bis-[4-(4-cyanato)-diphenoxy]-diphenylsulphone; 4,4'dicyanatodiphenylmethane, 4,4'-bis[p-cyanatophenyl]-diphenylmethane, 2,2-bis-(p-cyanatophenyl)-propane, 2,2-bis-(3,5-dimethyl-4-cyanatophenyl)-propane, 2,2-bis-(3,5-dichloro-4-cyanatophenyl)-propane, 1,1-bis-[p-cyanatophenyl]-cyclohexane, bis-[2-cyanato-1-naphthyl]methane, 1,2-bis-[p-cyanatophenyl]1,1,2,2-tetramethylethane, 4,4'-dicyanatobenzophenone, 4,4'-bis-(4-cyanato)-phenoxybenzophenone, 1,4-bis-[p-cyanatophenylisopropyl]-benzene, 2,2', 5,5'-tetracyanatodiphenylsulphone; polycyanic esters of novolaks (reaction products of phenol or alkyl- or halogen-substituted phenols with formaldehyde in acid solution) containing from 3 to 5 OCN-groups.

In cases where it is desired to use particularly pure aromatic cyanic acid esters with a high stability in storage it is advisable to adopt a procedure similar to that described in our copending U.S. Application, Ser. Nos. 658,814 or 658,815 which relate to the production of highly pure polyfunctional cyanic acid esters. According to our copending U.S. Application, Ser. No. 658,814 filed Feb. 17, 1976 di- or poly-trialkyl ammonium phenolates (for example polytriethyl ammonium phenolates) are reacted with an excess of cyanogen halide in an organic solvent, optionally in the presence of catalytic quantities of trialkylamines such as triethylamine, to form the corresponding aromatic cyanic acid esters.

According to our copending U.S. Application, Ser. No. 658,815, filed Feb. 17, 1976 alkali metal or alkaline earth metal salts, preferably sodium, potassium, calcium and barium salts of aromatic dihydroxy or polyhydroxy compounds, are reacted with cyanogen halide in a solvent, optionally in the presence of catalytic quantities of a tertiary amine.

From 1 to 2 mols and preferably from 1 to 1.4 mols of cyanogen halide, and from 1 to 1.8 mols, preferably from 1 to 1.3 mols, of a base or base mixture may be used for every phenolic hydroxyl group, the base or the base mixture always being used in a deficit relative to the cyanogen halide.

Suitable solvents are, for example, water, lower aliphatic alcohols such as methanol, ethanol, propanol, isopropanol, butanol; aliphatic ketones such as acetone, methyl ethyl ketone, diethyl ketone, methyl isopropyl ketone, methyl isobutyl ketone; aliphatic or aromatic hydrocarbons, preferred aliphatic hydrocarbons being the fractions accumulating during distillation of the naturally occurring mixtures, such as petroleum ether, light petrol, petrol, whilst examples of aromatic hydrocarbons are benzene, toluene and xylenes; aliphatic and aromatic chlorinated hydrocarbons such as dichloromethane, dichloroethane, perchlorethylene, chlorobenzene, dichlorobenzene; ethers such as diethyl ether, diisopropyl ether, dioxan, tetrahydrofurane, di-sec.-butyl ether; nitrohydrocarbons such as nitromethane, nitrobenzene, nitrotoluene; amides such as dimethyl formamide, dimethyl acetamide; and mixtures thereof.

Suitable inorganic or organic bases are those mentioned in U.K. Patent Specification No. 1,007,790.

These processes are generally carried out at temperatures in the range from −40° C to +65° C and preferably at temperatures in the range from 0° to 30° C. In cases where cyanogen chloride is used, the reaction is preferably carried out below the boiling point (13° C), although where cyanogen bromide is used the reaction may even be carried out at temperatures above 50° C.

Tertiary amines, which are used in catalytic quantities (0.001 to 10% by weight, more especially 0.001 to 1.0% by weight, based on alkali metal or alkaline earth metal phenolate) in accordance with our copending U.S. Application Ser. No. 658,815 filed Feb. 17, 1976 correspond to the general formula

in which $R_1$, $R_2$, $R_3$ represent alkyl, aryl and cycloalkyl radicals which do not have to be the same, with from 1 to 36 carbon atoms, more especially with up to 18 carbon atoms, for example trimethylamine, triethylamine, methyl diethylamine, tripropylamine, tributylamine, methyl dibutylamine, dinonyl methylamine, dimethyl stearylamine, dimethyl cyclohexylamine, diethyl aniline.

The high-boiling esters used in accordance with the invention have boiling points above 250° C at 760 Torr, preferably above 300° C at 760 Torr. In some cases, they can no longer be distilled.

In the context of the invention high-boiling esters are phosphoric acid esters, phosphonic acid esters, sulphonic acid esters, carbonic acid esters and carboxylic acid esters preferably phosphoric acid esters, sulphonic acid esters and carboxylic acid esters.

Esters of this type, which are known as plasticisers for polymers, are described in detail, for example, in "Losungsmittel und Weichmachungsmittel" (Solvents and Plasticiers) by H. Gnamm and W. Sommer, (Wissenschaftliche Verlagsgesellschaft Stuttgart (1958), pages 515 to 735 and in "Weichmachungsmittel fur Kunststoffe und Lacke" (Plasticiers for Plastics and Lacquers) by W.M. Munzinger, Konradin-Verlag Robert Kohlhammer Stuttgart, (1959), pages 64 to 309.

The phosphoric acid esters are preferably aliphatic, aromatic or aliphatic-aromatic. The alkyl phosphates, preferably contain from 2 to 8 carbon atoms in the alcohol component which may optionally be chlorinated or interrupted by oxygen atoms. The aryl phosphates preferably contain from 6 to 11 carbon atoms in the aryl radical. The aliphatic aromatic mixed esters preferably contain the alkyl and aryl esters just defined.

The following are mentioned as examples of suitable phosphoric acid esters: trimethyl glycol phosphate $(CH_3O-C_2H_4O)_3PO$; tri[$\beta$-chloroethyl]-phosphate, tributylphosphate, tri(2-ethylhexyl)-phosphate, tributyl glycol phosphate $(C_4H_9OC_2H_4O)_3PO$, trioctyl phosphate, triphenyl phosphate, tricresyl phosphate, trixylenyl phosphate, tri(p-tert.-butyl phenyl)-phosphate, tri(p-tert.-amylphenyl)-phosphate, diphenyl monoxylenyl phosphate, cresyl diphenyl phosphate, 2-ethylhexyl diphenyl phosphate and diphenyl xylenyl phosphate.

Preferred sulphonic acid esters are aryl sulphonic acid alkyl ester, aryl sulphonic acid aryl ester and alkyl sulphonic acid aryl ester. In the above-mentioned esters, the aryl radical is always a phenyl radical or a phenyl radical substituted by $C_1 - C_4$ alkyl, whilst the alkyl radical is a $C_2$- to $C_{18}$-alkyl radical. $C_{12}$–$C_{18}$-alkyl sulphonic acid aryl esters are particularly preferred (Aryl = phenyl and/or cresyl).

Preferred carbonic acid esters are polycarbonates of phenols, more especially of bisphenol A, with molecular weights (Mw) of up to 10,000, or bis-(dimethylbenzyl)-carbonate.

Carboxylic acid esters include:
A Esters of polyhydric alcohols and monobasic carboxylic acids;
B Esters of monohydric alcohols and polybasic carboxylic acids;
C Esters of polyhydric alcohols and polybasic carboxylic acids;
D Abietic acid and dihydroabietic acid esters and methyl pentachlorostearate.

The polyhydric alcohols of group A are preferably glycerol, pentaerythritol or di-, tri- or tetra-ethylene glycols or the corresponding propylene glycols, whilst the monobasic carboxylic acids are preferably aliphatic carboxylic acids with 2 to 18 carbon atoms or benzoic acid. The following carboxylic acid esters are mentioned by way of example: glycerol tripropionate, glycerol tributyrate, glycerol tristearate, glycerol trilaurate, glycerol trioleate diethylene glycol diacetate, triethylene glycol diacetate, pentraerythritol tetra acetate, diethylene glycol dipropionate, triethylene glycol dipropionate, pentaerythritol tetrabutyrate, pentaerythritol diacetate dipropionate, triethylene glycol-di-(2-ethyl butyrate), tetraethylene glycol dipropionate, triethylene glycol-di-(2-ethyl hexoate) butoxy ethyl laurate, propylene glycol dilaurate, propylene glycol distearate, diethylene glycol dibenzoate and dipropylene glycol dibenzoate.

The monohydric alcohols of group B include aliphatic alcohols with 4 to 10 carbon atoms or optionally methyl-substituted cyclohexyl alcohol or benzyl alcohol or the phenol as aromatic alcohol. The monohydric alcohols also include monoalkyl ether glycols with 1 to 4 carbon atoms in the alkyl group. The following are mentioned as examples of esters of group B: dibutyl oxalate, dicyclohexyl oxalate, dibutyl adipate, di-(2-ethylhexyl)-adipate, dinonyl adipate, didecyl adipate, dibutyl sebacate, di-(2-ethyl hexyl)-sebacate, dibenzyl sebacate, dibutyl phthalate, di-(2-ethyl hexyl)-phthalate, di-isodecyl phthalate, di-(n-oxtyl n-decyl)-phthalate, di-(isooctyl-n-decyl)-phthalate, dicyclohexyl phthalate, di-(methyl cyclohexyl)-phthalate, di-(methyl glycol)-phthalate, $C_6H_4[COOC_2H_4OCH_3]_2$, di-(butyl glycol)-phthalate, benzyl butyl phthalate, diphenyl phthalate.

The esters of group C include poly esters of polyhydric alcohols such as ethylene glycol, propylene glycol, 1,4-butane diol, diethylene glycol, triethylene glycol, polyethylene glycol, polypropylene glycol, glycerol, trimethylol propane or mixtures thereof, and polybasic carboxylic acids, such as adipic acid, sebacic acid, phthalic acid and hexahydrophthalic acid or mixtures thereof with molecular weights (Mw) of up to about 8000.

The following are mentioned as examples of esters of group D: methyl abietate, methyl dihydroabietate, ethylene glycol diabietate, diethylene glycol diabietate and triethylene glycol dihydroabietate.

Of the carboxylic acid esters, groups B and C are particularly preferred.

It is readily possible to use mixtures of several high-boiling esters of the various groups for the process according to the invention.

The esters are used in quantities of up to 70% by weight, based on the mixture of high-boiling ester and aromatic cyanic acid ester or on the mixture of high-boiling ester and prepolymer. When used in quantities of up to 10% by weight and preferably in quantities of from 0.1 to 10% by weight and, more especially, in quantities of from 0.5 to 10% by weight, the high-boiling esters surprisingly improve the resistance of the polytriazines to hydrolysis. In cases where the esters are used in quantities of from about 10 to 70% by weight, preferably in quantities of from 10 to 50% by weight and, more especially, in quantities of from 10 to 40% by weight, a significant improvement in elasticity and flexibility is obtained in addition to the improvement in resistance to hydrolysis. In some cases, especially in cases where the phosphoric acid ester or methyl pentachlorostearate is used, the non-inflammability of the polytriazines is additionally improved.

The process according to the invention may be carried out by reacting the polyfunctional aromatic cyanic acid esters by heating them to a temperature of from about 30° C to 150° C, preferably from 50° to 100° C, in the presence of at least one high-boiling ester, either in the presence or absence of a solvent and optionally in the presence of a catalyst or catalyst mixture, to form partially crosslinked prepolymers which are still soluble in organic solvents. The prepolymers represent cyanate-group-containing polytriazines of liquid, wax-like or solid consistency and are soluble in organic solvents. They are highly stable in storage. As shown by the IR spectrum, they have the band characteristic of the O-C≡N-group at 4.5 μ in addition to the band of the triazine structure.

However, it is also readily possible to add the high-boiling esters after the prepolymers have been formed.

The prepolymers may be converted into high molecular weight polymers of triazine structure by heating to a temperature of from about 100° C to 350° C, preferably from 120° C to 250° C in the presence of the high-boiling ester, optionally in the presence of a catalyst or catalyst mixture and either in the presence or absence of a solvent. The end products are substantially insoluble in solvents and can no longer be melted. As shown by the IR-spectrum, there are no other linkage principles in the polymer apart from triazine structures.

The polytriazines may, of course, also be produced in a single stage.

Suitable catalysts for the production of the prepolymer and the high molecular weight polymer product with triazine structures include acids, bases, salts, nitrogen and phosphorus compounds, for example Lewis acids such as $AlCl_3$, $BF_3$, $FeCl_3$, $TiCl_4$, $ZnCl_2$, $SnCl_4$, proton acids such as HCl, $H_3PO_4$; aromatic hydroxy compounds such as phenol, p-nitrophenol, pyrocatechol, dihydroxy naphthalene; sodium hydroxide sodium methylate, sodium phenolate, trimethyl amine, triethyl amine, tributyl amine, diazbicyclo-(2,2,2)-octane, quinoline isoquinoline, tetrahydroisoquinoline, tetraethyl ammonium chloride, pyridine-N-oxide, tributyl phosphine, phospholine -$\Delta^3$-1-oxa-1-phenyl, zinc octoate, tin octoate, zinc naphthenate, and mixtures thereof.

The catalysts may be used in quantities of from 0.001% by weight to 10% by weight, based on prepolymer or on aromatic cyanic acid ester, or if desired in even larger quantities.

The prepolymers may be used, in solution in inert solvents such as acetone, benzene, xylene, chlorobenzene, ethyl acetate, tetrahydrofuran, dibutyl ether, dimethyl formamide, or in powder form, for the production of coatings on such substrates as metals, ceramics, glass and earthenware, etc., or in solution in organic solvents, as impregnating lacquers or laminating resins. If desired, the prepolymers may be combined with fillers, pigments, glass fibres, metal fibres and glass cloths, and may be used for the production of mouldings or laminates. Yellow to brown coloured, transparent polymer products with extreme hardness and a high temperature resistance are obtained after hardening.

Polytrimerisation of the aromatic cyanic acid esters and production of the prepolymers may be carried out in the presence of fillers or reinforcing materials.

The polyfunctional aromatic cyanic acid esters may be combined with the powder-form or fibrous fillers or reinforcing materials either before or after heat treatment of the aromatic cyanic acid esters and by basically any method. For example, it is possible to impregnate powder-form or fibrous fillers or reinforcing materials, such as quartz sand or glass cloths, with the aromatic cyanates, optionally in solution. Examples of the solvents which may be used for this purpose and which, generally, have to be removed again afterwards, are inert solvents such as methylene chloride, acetone, methylethyl ketone, xylene, ethyl acetate benzene, toluene, tetrahydrofuran, chlorobenzene, dibutyl ether, dimethyl formamide and tetramethylene sulphone.

Suitable fillers and reinforcing materials are, generally, in any powder-form and/or fibrous products, for example of the type commonly used in the production of mouldings based on unsaturated polyester resins or epoxide resins. Examples of products such as these are, primarily, granular fillers such as quartz powder, ground shale, asbestos powder, powdered corundum, chalk, iron powder, aluminium powder, sand, gravel and other fillers of this kind, also inorganic or organic fibres, more especially glass fibres in the usual textile forms of fibres, filaments rovings, yarns, nonwovens, mats and cloths, etc. In this connection, amino silane-based finishes have proved to be particularly effective. It is also possible to use corresponding textile structures of organic, preferably synthetic fibres (polyamides, polyesters) or on the basis of quartz, carbon, metals etc., as well as monocrystals (whiskers).

The end products combined with fillers or reinforcing materials may be used in particular in vessel and pipe construction by the winding technique, in electrical engineering, in mould construction and tool making and also in the construction of heavily stressed components, in the lightweight construction of vehicles and in aeronautical and astronautical engineering.

The percentage contents and parts quoted in the Examples relate to weight unless otherwise indicated.

EXAMPLE 1

90 parts of bis-2,2-(p-cyanatophenyl)-propane and 10 parts of p-tricresyl phosphate were heated with stirring for 6 hours to a temperature of 170° C. A very viscous, pale yellow coloured prepolymer was obtained after cooling to room temperature. It was fluid above 70° C ($n_D^{90} = 1.5720$). The IR-spectrum showed the characteristic bands at 4.5 μ (-O≡C-N) and at 6.4 μ and at 7.25 μ (s-triazine ring).

Hardening of this prepolymer into an extremely hard, non-inflammable transparent polytriazine was carried out over a period of 4 hours at 200° C following the addition of 0.02% by weight of zinc octoate.

EXAMPLE 2

60 parts of bis-2,2-(p-cyanatophenyl)-propane and 40 parts of p-tricresyl phosphate were heated with stirring for 6 hours to 170° C. A pale yellow, viscous filament-forming prepolymer was obtained after cooling to room temperature ($n_D^{90}$: 1.5590).

Hardening into a yellow, elastic, non-inflammable polytriazine which is rubber-like at 180° C was carried out over a period of 6 hours at 180° C in the presence of 0.01% by weight of zinc octoate.

EXAMPLE 3

40 parts of bis-2,2-(p-cyanatophenyl)-propane and 60 parts of p-tricresyl phosphate were heated with stirring for 7 hours to 160° – 170° C. A honey-like prepolymer was obtained after cooling ($n_D^{90}$: 1.5500).

Hardening to form a highly elastic, non-inflammable transparent polytriazine was carried out over a period

EXAMPLE 4

30 parts of bis-2,2-(p-cyanatophenyl)-propane and 70 parts of p-tricresyl phosphate were heated with stirring for 7 hours to 170° C. A thinly liquid prepolymer ($n_D^{90}$ : 1.5360) was obtained after cooling. Hardening to form a non-inflammable transparent polytriazine, which was jelly-like at room temperature, was carried out over a period of 4 hours at 190° C following the addition of 0.5% by weight of pyrocatechol and 0.5% by weight of diazabicyclo-(2,2,2)-octane.

EXAMPLE 5

60 parts of resorcinol dicyanate and 40 parts of p-tricresyl phosphate were heated with stirring over a period of 5 hours to 160° C. A prepolymer was obtained after cooling ($n_D^{90}$: 1.5520). Hardening of this prepolymer to form a honey-coloured, elastic, non-inflammable and transparent polytriazine was carried out over a period of 4 hours at 180° C following the addition of 0.01% by weight of zinc octoate.

EXAMPLE 6

90 parts of bis-2,2-(4-cyanato-3,5-dimethyl phenyl)-propane and 10 parts of triphenyl phosphate were heated for 3 hours to 120° – 130° C following the addition of 0.1% by weight of tin octoate. The temperature was then increased to 180° C and kept at that level for 2 hours. Tempering for 30 minutes at 220° C gave an extremely hard, non-brittle, flameproof and transparent polytriazine.

EXAMPLE 7

95 parts of hydroquinone dicyanate and 5 parts of diphenyl cresyl phosphate were heated for 4 hours to 140° C in the presence of 0.05% by weight of pyrocatechol and 0.05% by weight of diazabicyclo-(2,2,2)-octane. The temperature was then increased to 180° C and kept at that level for 3 hours. A hard, but non-brittle, yellow-brown transparent plytriazine was obtained.

EXAMPLE 8

80 parts of 4,4'-dicyanatodiphenyl and 20 parts of diphenyl octyl phosphate were heated slowly to 120° C following the addition of 0.3% by weight of zinc octoate. Hardening to form a solid, non-brittle, non-inflammable transparent polytriazine ceased after 1 hour.

EXAMPLE 9

70 parts of bis-2,2-(4-cyanatophenyl)-propane and 30 parts of trioctyl phosphate were heated for 5 hours to 170° C and then for 3 hours to 190° C in the presence of 0.01% by weight of tin octoate. An elastic, non-inflammable opaque polytriazine, which was rubber-like at 180° C was obtained after cooling.

EXAMPLE 10

70 parts of 4,4'-dicyanatodiphenyl sulphone and 30 parts of dioctyl phthalate were heated for 3 hours to 200° C in the presence of 0.02% by weight of zinc octoate. An elastic, transparent polytriazine was obtained.

EXAMPLE 11

80 parts of dicyanatospiroindane

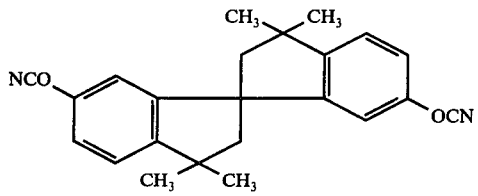

and 20 parts of benzyl butyl phthalate were heated for 6 hours to 170° C and then for 2.5 hours to 220° C in the presence of 0.01% by weight of zinc octoate. A hard, but non-brittle transparent polytriazine was obtained after cooling.

EXAMPLE 12

90 parts of bis-1,1-(4-cyanatophenyl)-cyclohexane and 10 parts of benzyl butyl adipate were heated for 4 hours to 170° C and then for 1 hour to 200° C in the presence of 0.02% by weight of zinc octoate. A hard, but non-brittle transparent polytriazine was obtained after cooling.

EXAMPLE 13

5 kg of bis-2,2-(4-cyanatophenyl)-propane were heated with stirring for 8 hours to 150° C following the addition of 1% by weight of bis-2,2-(4-hydroxyphenyl)-propane. A prepolymer which was solid at room temperature and which softened at 50 to 60° C, being pourable above 80° C, was obtained after cooling ($n_D^{90}$ : 1.5770).

70 parts of this prepolymer and 30 parts of diphenyl octyl phosphate were heated for 3 hours to 180° C following the addition of 0.1% by weight of a mixture of bis-2,2-(4-hydroxyphenyl)-propane and diazabicyclo-(2,2,2)-octane (in a ratio of 1 : 1). An elastic, yellow-brown, non-inflammable transparent polytriazine was obtained.

EXAMPLE 14

80 parts of the prepolymer obtained in accordance with Example 13 were heated for 6 hours to 200° C with 20 parts of dioctyl phthalate and 0.01% by weight of zinc octoate. A pale yellow, clouded, solid but non-brittle polytriazine was obtained after cooling.

EXAMPLE 15

90 parts of the prepolymer obtained in accordance with Example 13 and 10 parts of tri-(s-chloroethyl)-phosphate were heated for 5 hours to 190° C in the presence of 0.01% by weight of tin octoate. A hard, but non-brittle, non-inflammable transparent polytriazine was obtained.

EXAMPLE 16

60 parts of the prepolymer produced in accordance with Example 13 and 40 parts of octane sulphonic acid phenyl ester were heated for 2.5 hours to 180° C with 0.06% by weight of zinc octoate. An elastic polytriazine was obtained after cooling.

EXAMPLE 17

80 parts of the prepolymer obtained in accordance with Example 13 and 20 parts of a polyester, obtained from 1,4-butane diol, ethylene glycol and adipic acid (hydroxyl number 55), were heated for 3 hours to 200° C. An elastic, transparent polytriazine was obtained.

EXAMPLE 18

60 parts of the prepolymer obtained in accordance with Example 13 and 40 parts of a polyester, obtained from adipic acid and propylene glycol (hydroxyl number 60 - 70), were heated for 6 hours to 160° C. An elastic, transparent polytriazine rubber-like at 180° C was obtained.

We claim:

1. A polytrimerizable mixture of 30 to 99.9% by weight of at least one aromatic cyanic acid ester of the formula

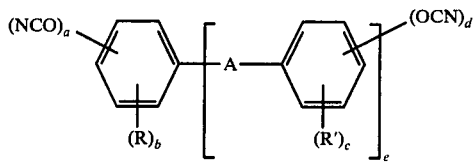

wherein

R is hydrogen, halogen, alkyl having 1 to 9 carbon atoms, phenyl, alkoxy having 1 to 4 carbon atoms or alkoxy carbonyl having 1 to 4 carbon atoms in the alkyl moiety, or two R substituents together on adjacent carbon atoms of the phenyl moiety to which they are attached together form a hydrocarbon ring containing from 5 to 6 carbon atoms or together form with O, S or N a 5 or 6-membered heterocyclic ring; R' has the same meaning as R or is the group

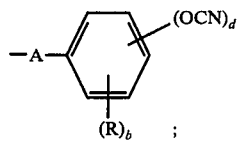

A is a bond, alkylene having 1 to 9 carbon atoms or said alkylene substituted by phenyl or alkyl having 1 to 4 carbon atoms, a divalent cycloaliphatic or aromatic 5 or 6-membered ring or said divalent ring including oxygen as a hetero atom, oxygen, $-SO_2-$,

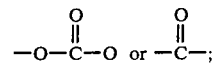

$a$ is 0 to 5 when $e$ is 1 and 2,5 when $e$ is 1;
$b$ is 5 - $a$ when $e$ is 1 and 6 - $a$ - $d$ when $e$ is 0;
$c$ is 5 - $d$;
$d$ is 0 to 5; and
$e$ is 0 to 3 with the proviso that the sum of $a + d$ is always from 2 to 5.

or a partially cross-linked prepolymer of said cyanic ester of said formula which is soluble in organic solvents and 0.1 to 70% by weight of at least one high boiling ester plasticizer having a boiling point above 250° C at 760 Torr.

2. A polytrimerisable mixture as claimed in claim 1, consisting of 90.0 to 99.9% by weight of said at least one aromatic cyanic acid ester or said prepolymer thereof and 0.1 to 10% by weight of at least one high-boiling ester with a boiling point above 250° C at 760 Torr.

3. A polytrimerisable mixture as claimed in claim 1, consisting of 50 to 90% by weight of said at least one aromatic cyanic acid ester or said prepolymer thereof and 10 to 50% by weight of at least one high-boiling ester with a boiling point above 250° C at 750 Torr.

4. A process for producing a polytriazine which comprises heating the mixture of claim 1 to a temperature of from about 100 to 350°C.

5. A process as claimed in claim 4 wherein said heating is carried out in the presence of a catalytic amount of a catalyst selected from the group consisting of zinc octoate, tin octoate, diazabicyclo-(2,2,2)-octane, pyrocatechol and bis-2,3-(4-hydroxyphenyl)-propane.

6. A process as claimed in claim 4, wherein the high-boiling ester is used in a quantity of from 0.1 to 10% by weight.

7. A process as claimed in claim 4, wherein the high-boiling ester is used in a quantity of from 10 to 50% by weight.

* * * * *